(12) United States Patent
Fritchman et al.

(10) Patent No.: US 9,395,778 B2
(45) Date of Patent: Jul. 19, 2016

(54) HIGH VOLTAGE CHARGING FOR A PORTABLE DEVICE

(71) Applicant: Apple Inc., Cupertino, CA (US)

(72) Inventors: Dan Fritchman, San Francisco, CA (US); Jeffrey J. Terlizzi, San Francisco, CA (US); Nicholas A. Sims, San Francisco, CA (US); Paul Thompson, San Jose, CA (US); Scott Krueger, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 251 days.

(21) Appl. No.: 14/080,683

(22) Filed: Nov. 14, 2013

(65) Prior Publication Data

US 2014/0136863 A1 May 15, 2014

Related U.S. Application Data

(60) Provisional application No. 61/726,084, filed on Nov. 14, 2012.

(51) Int. Cl.
*G06F 1/26* (2006.01)
*G06F 1/32* (2006.01)
*H02J 7/00* (2006.01)

(52) U.S. Cl.
CPC ............. *G06F 1/26* (2013.01); *H02J 7/0004* (2013.01); *H02J 7/0011* (2013.01); *H02J 7/0055* (2013.01); *G06F 1/263* (2013.01); *G06F 1/266* (2013.01); *G06F 2221/2129* (2013.01); *H02J 7/0027* (2013.01); *H02J 7/0036* (2013.01); *H02J 2007/0001* (2013.01); *H02J 2007/0062* (2013.01); *H02J 2007/0096* (2013.01)

(58) Field of Classification Search
CPC .......... G06F 1/26; G06F 1/263; G06F 1/266; H02J 7/0027; H02J 2007/0096
USPC .......................................... 713/300, 330, 340
See application file for complete search history.

(56) References Cited

U.S. PATENT DOCUMENTS

| | | | |
|---|---|---|---|
| 7,447,922 B1 | 11/2008 | Asbury et al. | |
| 2004/0251878 A1 | 12/2004 | Veselic | |
| 2008/0059816 A1 | 3/2008 | Paniagua et al. | |
| 2011/0197075 A1* | 8/2011 | Hsieh | G06F 1/26 713/189 |
| 2012/0229076 A1* | 9/2012 | Zhu | H04L 25/02 320/107 |

FOREIGN PATENT DOCUMENTS

| | | | |
|---|---|---|---|
| EP | 2 485 462 A1 | 8/2012 | |
| TW | 201243565 A1 | 11/2012 | |

OTHER PUBLICATIONS

International Preliminary Report on Patentability mailed on May 28, 2015 for PCT Patent Application No. PCT/US2013/063835, 12 pages.

(Continued)

*Primary Examiner* — Michael J Brown
(74) *Attorney, Agent, or Firm* — Kilpatrick Townsend & Stockton LLP

(57) ABSTRACT

Techniques for performing high-voltage charging of electronic devices are provided. A portable device can communicate with a power supply over a data communication line to determine if the power supply is capable of performing the high-voltage charging operation. If yes, the portable device instructs the power supply to provide a specific voltage.

18 Claims, 8 Drawing Sheets

(56) References Cited

OTHER PUBLICATIONS

Invitation to Pay Additional Fees mailed on Feb. 10, 2014 for PCT Patent Application No. PCT/US2013/063835, 4 pages.

International Search Report and Written Opinion mailed on Apr. 30, 2014 for PCT Patent Application No. PCT/US2013/063835, 15 pages.

Office Action for Taiwanese Patent Application No. 102138757, mailed Dec. 8, 2014, 14 pages.

* cited by examiner

| GND | Data A+ | Data A- | ACC_ID | P_IN | Data B- | Data B+ | ACC_PWR |
|---|---|---|---|---|---|---|---|
| 806(1) | 806(2) | 806(3) | 806(4) | 806(5) | 806(6) | 806(7) | 806(8) |

HIGH VOLTAGE CHARGING FOR A PORTABLE DEVICE

CROSS-REFERENCES TO RELATED APPLICATIONS

This application is a non-provisional of U.S. Provisional Application No. 61/726,084 filed Nov. 14, 2012, the disclosure of which is incorporated by reference in its entirety.

BACKGROUND

Portable devices are ubiquitous in present day. People use portable devices for performing variety of such as wireless communication, data computing, surfing the Internet, running specialised applications, gaming, etc. Portable devices include but are not limited to mobile phones, tablet computers, laptop PC's, PDA's, etc.

Due to the size of these portable devices, the power source for these devices, e.g., an internal battery, is often small and of limited capacity. As a result, the battery of a portable device may have to be frequently charged in order to keep the portable device operational. Depending on the amount of charge an internal battery of a portable device is designed to handle, the charging time for the battery may range from 1-2 hours to over 12 hours. The main reason being the voltage (and consequently the current) used to charge these portable devise is usually less than to close to 5 V, which results in longer charging time. As the demand for higher capacity batteries in portable devices increases, the charging times will get longer.

SUMMARY

The present invention generally relates to portable devices. Specifically, embodiments of the present invention relate to using high-voltage to charge an internal or external battery of a mobile device.

Embodiments of the present invention provide a method for charging a portable device using a power supply. The method includes the portable device detecting coupling of the power supply and receiving identification information from the power supply. The portable device then enables a communication channel between the power supply and the portable device based on the identification information and receives additional information from the power supply over the communication channel. The portable device then determines based on additional information received from the power supply that the power supply is capable of providing voltage of up to 20 V and sends a message to the power supply to output a specific voltage. The portable device then receives the specified voltage. In some embodiments, the communication channel can be a universal asynchronous receiver/transmitter (UART) transport or universal serial bus (USB) transport.

Other embodiments of the present invention provide a method performed by a power supply. The method includes receiving a message from a portable device coupled to the power supply, the message requesting capability information from the power supply over a data communication channel. The data communication channel is separate from the power output signal. Thereafter the method further includes sending the capability information to the portable device. In an embodiment, the capability information includes information about whether the power supply is capable of outputting between 6 V and 20 V to the portable device. The method further includes receiving another message specifying a value for a voltage to be outputted by the power supply and outputting of the specified voltage by the power supply.

A particular embodiment of the present invention provides a method performed by a power supply for detecting disconnection of the portable device from the power supply and then performing a specific action by the power supply. The method includes outputting a first voltage to the portable device a communication line between the power supply and the portable device to determine whether the communication line changes from an active state to an inactive state and if the communication line changes from the active state to the inactive state, the method includes outputting a second voltage to the portable device. The second voltage is lower than the first voltage. In an embodiment, the first voltage can be between 6V and 20V and the second voltage can be 5V or lower.

Another embodiment of the present invention provides an electronic device. The electronic device includes a first connector that further includes a first plurality of contacts configured to mate with a second connector of an accessory. The second connector has a second plurality of contacts. At least one contact from the first plurality of contacts carries power to the electronic device and at least pair of contacts from the first plurality of contacts carry data between the electronic device and the accessory. The electronic device further includes circuitry coupled to the first connector. The circuitry can detect coupling of the accessory, receive identification information from the accessory, enable a communication channel with the accessory over the pair of contacts from the first plurality of contacts, and receive capability information from the accessory over the communication channel. The capability information indicates that the accessory is capable of supplying an output voltage between 6V and 20V to the electronic device. The circuitry can send an instruction to the accessory to output a specific voltage between 6V and 20V, and receive the specified voltage.

Yet another embodiment of the present invention provided a power supply. The power supply includes a connector having a power contact coupleable with an electronic device to deliver power to the electronic device and a pair of data contacts, a voltage regulator that can provide an output voltage in the range of 1-20 V via the at least one contact, a controller coupled to the pair of data contacts that can exchange information with the electronic device via the pair of data contacts, and identification circuitry that is operable to generate identification information for the power supply. The power supply is further designed to output a first voltage over the power contact upon connection with the electronic device, provide identification information to the electronic device, receive a request from the electronic device over the pair of data contacts, the request being for determining whether the power supply can output a second voltage, send a response to the request indicating that the power supply can output the second voltage over the power contact, receiving a request from the electronic device to output the second voltage, and output the second voltage. The second voltage is higher than the first voltage.

The following detailed description, together with the accompanying drawings will provide a better understanding of the nature and advantages of the present invention.

DETAILED DESCRIPTION

Figure 1:
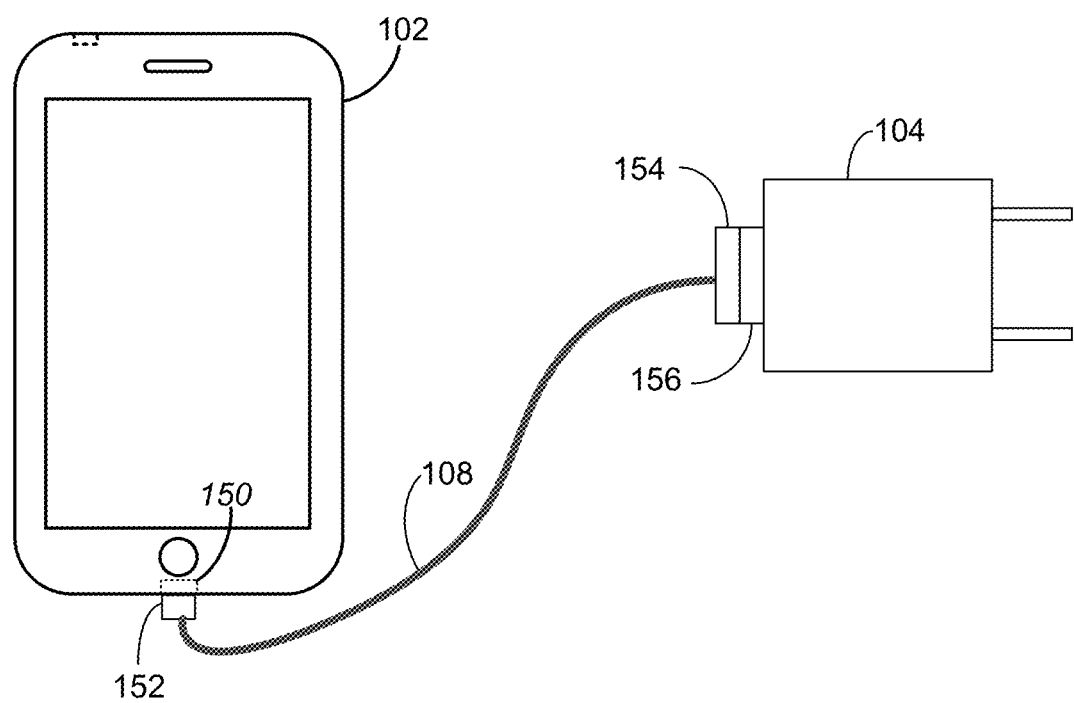
FIG. 1 illustrates a system block diagram according to an embodiment of the present invention.

Embodiments of the present invention generally relate to portable devices. A particular embodiment of the present invention provides a method for safely charging a portable device using high voltage input. In some instances, the input voltage can be as high as 20 V.

Portable devices generally have smaller dimensions than non-portable devices. Also, there is heavy emphasis on ensuring low power consumption and low heat dissipation in portable devices to due to the limited heat dissipation capacity of portable devices. Also, since the overall dimensions of a portable device are small and are getting smaller by the day, there is limited real-estate in the device that can be dedicated to components such as processors, connectors, peripherals devices, battery, etc. Portable devices are constantly experiencing expanding functionality, which consequently needs more available power to run the internal components that provide the functionality. One of the biggest issue facing today's portable devices is the length of time that an internal battery can provide the needed power to run the portable device.

Battery technology has come a long way in the past decade. In the present day, batteries that can fit in the palm of your hand can provide power to a portable device for up to 10 hours at a time. To provide power for longer durations, the capacity of a battery to hold a charge has to proportionally increase. New technology is constantly providing ways to pack large amount of charging holding capacity in smaller size batteries. On the flip side, the larger the capacity of a battery, the longer it takes to completely charge a battery. For example, for battery having a capacity of about 12,000 mAh, it takes upwards of 13 hours to charge from 0 to 100% with 1 Amp current being used to charge the battery. However, if the current is increased to 2 Amps, the charging time can be reduced to about 7 hours, which is about 50% reduction in charging time. As is well-known in the art, the amount of current that can be drawn depends on the available voltage and the load (resistance) associated with the device to be charged. The relationship between voltage and current is given by $$I=V/R \qquad (1)$$

Where I=current, V=voltage, and R=resistance (load). Thus, in order to increase the charging current I, either the available voltage has to be increased or the resistance has to be decreased. The resistance can be safely lowered only to a certain value before it becomes unsafe and/or impractical. The resistance for a portable device is usually fixed and varies based on the manufacturer of the portable device. Thus, for a constant resistance R, the only way to increase the charging current is to increase the available voltage.

However, increasing available voltage for charging also runs the risk of increased chances of arcing and damage due to shorting of the high voltage to ground. Thus, it is not trivial to use high-voltage charging, especially in portable devices since the increased risk of damage to the portable device. Also if a low-voltage device is accidently plugged into a high-voltage charger, it may damage the low-voltage device.

Embodiments of the present invention provide techniques for using high voltage, e.g., between 10 and 20V for charging a battery of a portable device. FIG. 1 is a high-level block diagram of a system showing an exemplary charging scenario of a portable device according to an embodiment of the present invention.

A portable device 102 may be connected to a power supply 104 via an accessory 108. Accessory 108 can be a cable as shown in FIG. 1 or an adapter of some sort. Portable device 102 may have an accessory interface 150 that is used to receive power and exchange data and commands with the accessory. In some embodiments, accessory interface 150 may be a connector having multiple contacts that are used to communicate with accessory 108 and power supply 104. As described above portable device 102 may be a mobile phone, a media player, a tablet computer, or the like. Accessory 108 may have two connectors 152 and 154. Connector 152 may be designed to mate with accessory interface 150 of portable device 102. Once mated, portable device 102 may communicate with accessory 108 via accessory interface 150 and connector 152. An embodiment of accessory interface 150 and connector 152 are described below in detail. Accessory 108 can have another connector 154 that can be designed to connect with a connector of power supply 104. In some embodiments, connector 154 can be any of commonly used connectors such as USB, D-sub, microUSB, etc. Power supply 104 may also have a connector 156 that is designed to mate with connector 154 of accessory 108. Power supply 104 can communicate with accessory 108 and portable device 102 via connector 156. In some embodiments, connector 156 may be complimentary to connector 154. Power supply 104 may have another interface that couples to a power source, e.g., a wall socket, to receive power.

In operation, after accessory 108 is connected to portable device 102, the portable device can identify and authenticate accessory 108. Thereafter when power supply 104 is connected to accessory 108, the portable device can identify and authenticate power supply 104. Thereafter, power supply 104 can start providing power to portable device 102. As described above, in order to more quickly charge a battery of portable device 102, a higher current may need to be provided to the portable device, which consequently means that power supply 104 may need to support higher voltage output, e.g., up to 20 V. In the system illustrated in FIG. 1, power supply 104 may output up to 20 V via connector 156 to accessory 108. Accessory 108 in turn would provide that voltage to portable device 102 via connector 152. In some embodiments, connector 152 may have a power contact that mates with a corresponding power contact of accessory interface 150 of portable device 102. The power contact of connector 152 will then carry the output voltage to be delivered to portable device 102. In some embodiments, connector 152 may also be compatible with devices other than portable device 102. These other devices may not be capable of handling the higher output voltage. Therefore it may not be advisable to output a constant 20 V output via connector 152, unless it is determined that the device connected to connector 152 is capable of handling the higher output voltage. Also, depending on the design of connector 152, if the contacts of connector 152 are exposed then having a 20 V signal on an exposed power contact of connector 152 presents serious safety hazards for both the portable device as well as anyone who may come in contact with the exposed power contact. Thus, it is not trivial to provide the 20 V for charging portable device 102.

Figure 2:
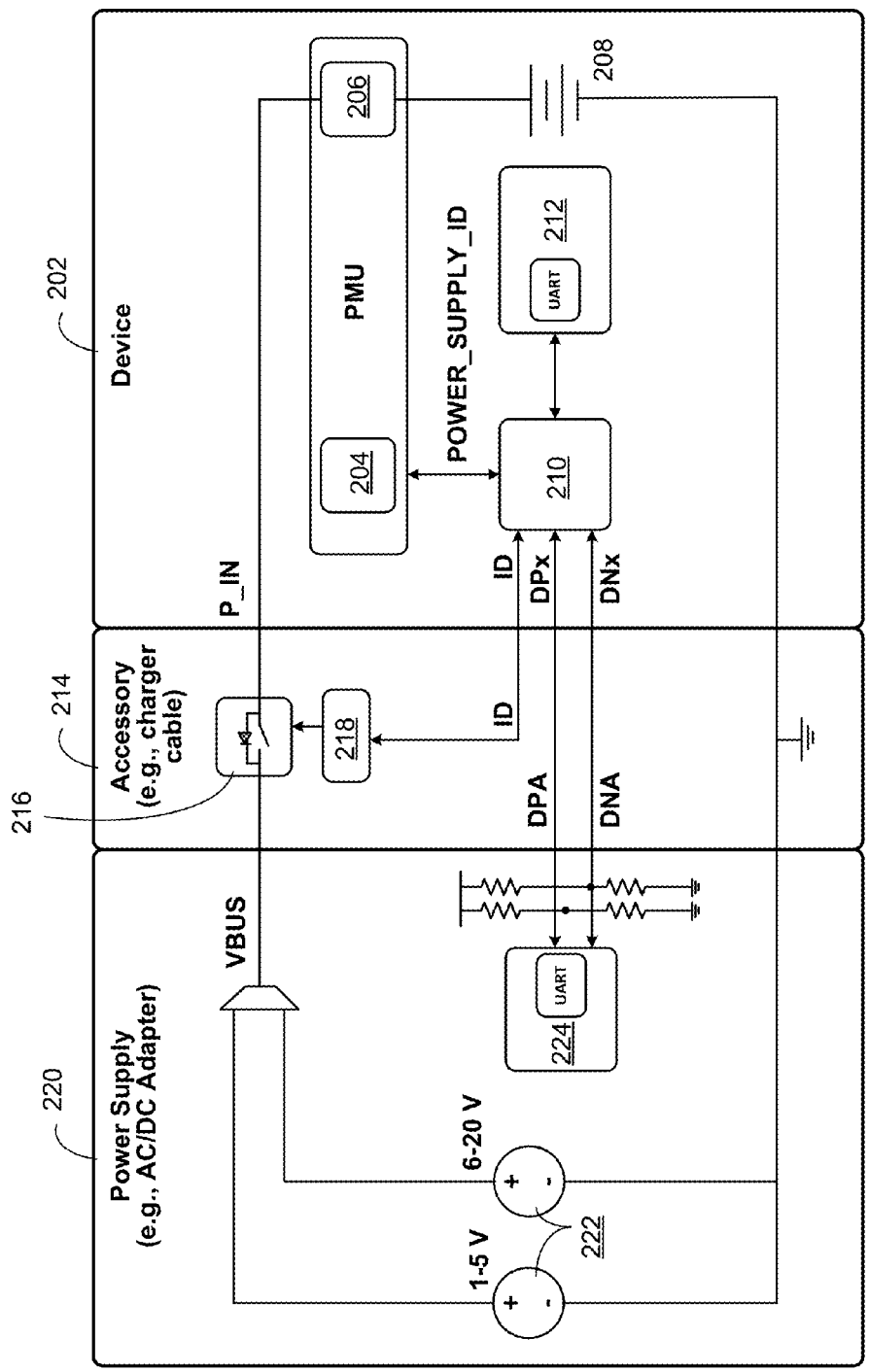
FIG. 2 is a schematic illustrating high voltage charging of a portable device according to an embodiment of the present invention.

FIG. 2 is a schematic that illustrates the electrical scheme for enabling high voltage charging according to an embodiment of the present invention. Portable device 202 (similar to portable device 102 of FIG. 1) includes an accessory ID detector unit 204 and a battery charging controller unit 206. Battery charger controller unit 206 controls charging of an internal battery 208. Accessory ID detector 204 is coupled to a switching circuitry 210, which is also coupled to a processor 212 that controls the operation of portable device 202. Accessory 214, e.g., a charging cable, (similar to accessory 108 of FIG. 1) is connected to portable device 202 as illustrated. It is to be noted that only four (4) contacts are shown connected between accessory 214 and portable device 202. However, one skilled in the art will realize that accessory 214 and portable device 202 can have many more contacts in their respective connectors that are not specifically shown in FIG. 2. As shown in FIG. 2, for a charging operation, there are four signals of interest. The P_IN signal is the power being received by portable device 202 from a power supply 220 via accessory 214. The ID signal is used to identify and authenticate accessory 214 to portable device 202. The data pair signals DPx and DNx are part of a differential data pair that can carry data between accessory 214 and portable device 202 using several different protocols such as USB protocol, UART protocol, a custom accessory protocol, etc.

Accessory 214 also includes a power control unit 216 that controls power input to portable device 202. Power control unit 216 has two internal power paths. A first path is designed to output a voltage on the P_IN contact that is substantially same as the voltage received from power supply 220 over the VBUS line. The second power path includes a current-limited voltage regulator that outputs a very low voltage/current via the P_IN contact, usually in the range of few hundred millivolts. This is the default state of power control unit 216. Accessory 214 also includes an identification unit 218 that stores identification information about accessory 214. The identification information can include, model #, serial #, or type of the accessory, information about whether the accessory is designed for use in high voltage applications, etc. Power control unit 216 and identification unit 218 can be implemented together as a single integrated circuit (IC) or a as two separate IC's.

Power supply 220 (similar to power supply 104 of FIG. 1) can include a voltage regulator 222 that is capable of providing an output voltage in the range of 1 V to 20 V in various increments. Power supply 220 also includes a controller 224 that is used to exchange information with portable device 202. In some embodiments, controller 224 may include a UART interface 226 that can be coupled to a UART interface in processor 212 of portable device 202, via accessory 214. Power supply 220 also includes a voltage divider circuit coupled with each of the data pair lines DPx and DNx. The voltage divider circuit provides an identification signal associated with power supply 220 that can be interpreted by portable device 202 via the accessory identifier unit 204 to determine a type for power supply 220. Different power supplies will have different value resistors in the voltage divider circuit thus generating different values as the identification signal. Portable device 202 can read these values and use a lookup table to determine the type for power supply 220.

Figure 3A:
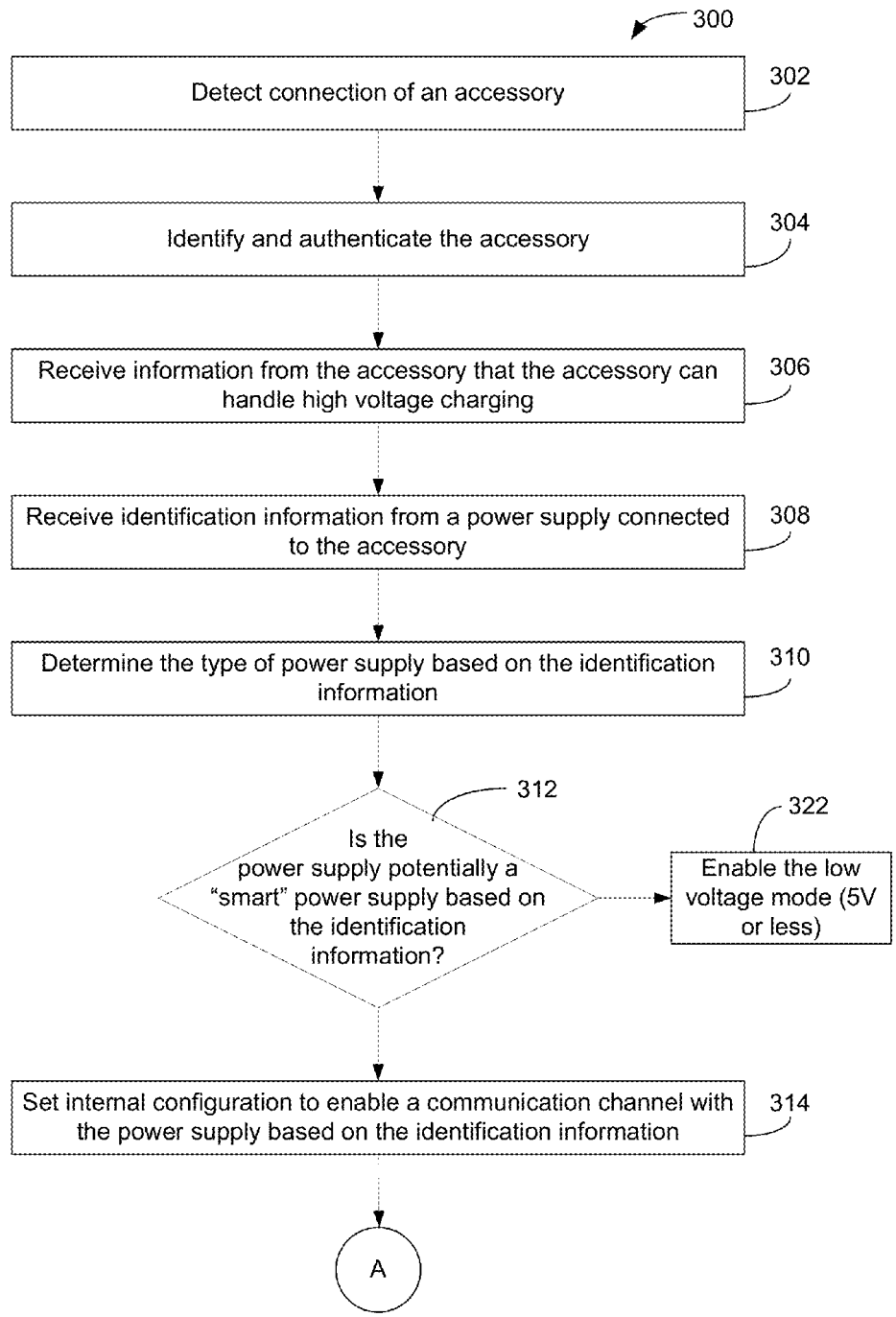
FIGS. 3A and 3B is a flow diagram of a process for performing high-voltage charging according to an embodiment of the present invention.
Figure 3B:
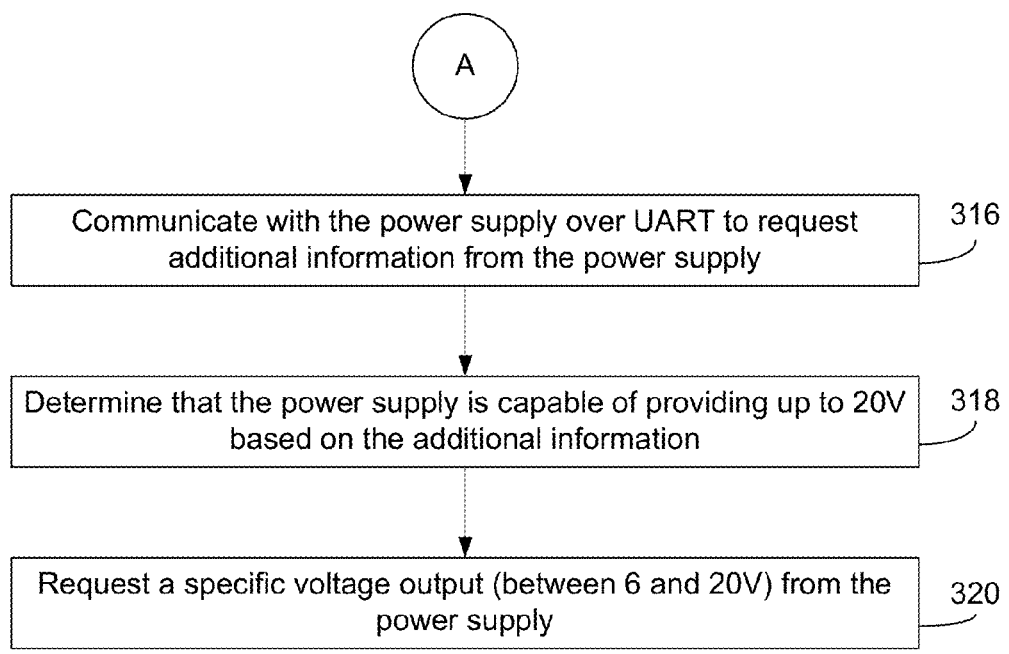

FIGS. 3A and 3B show a flow diagram of a process 300 for providing power to a portable device (e.g., portable device 202 of FIG. 2) according to an embodiment of the present invention. Process 300 can be performed by, e.g., portable device 202 of FIG. 2. Initially, the accessory, e.g., accessory 214 of FIG. 2, is connected to the portable device and the portable device can detect connection of the accessory (step 302). Once connected, the portable device can authenticate and identify the accessory (step 304). In some embodiments, authenticating the accessory may include a determination that the accessory is authorized to work with the portable device. As part of the identification and authentication process or shortly thereafter, the portable device may receive information from the accessory about whether the accessory capable of handling a high-voltage charging operation (step 306). In some embodiments, the information may be conveyed via a bitmask which includes a bit that is set to "1" if the accessory supports high-voltage charging and is set to "0" if the accessory does not support high-voltage charging. In this application, "high-voltage charging" is used to designate a charging process wherein the portable device receives between 6 V and 20 V from a power supply for charging its internal battery. In a particular embodiment, the high voltage may be between 10 V and 20 V.

Thereafter, the portable device may receive identification information from a power supply connected to the accessory (step 308). For example, after the power supply is coupled to the portable device, the portable device may "read" the power supply identification information provided by the voltage divider circuit within the power supply via the data lines DPA and DNA as illustrated in FIG. 2. In this application, this identification information is referred to as the "power supply ID." The power supply ID can be used by the portable device to identify the type of the power supply (step 310). For example, different portable devices may need different charging voltages/currents. Accordingly, a power supply may be designed to work with a certain "class" of portable devices, e.g., portable devices that need about 3V and/or 1 Amp for charging. Such a power supply may not work with other class of portable devices that may need a different voltage/current specification. In some embodiments, the power supply ID can be used by the portable device to determine a general class of the power supply. Based on the identification information, the portable device may determine whether the power supply is potentially a "smart power supply" (step 312). A "smart power supply" in this context means a power supply that is able to exchange capability and other information (other than provide power) with the portable device over dedicated data lines and optionally, the power supply is able to provide an output voltage of up to 20V. If the portable device determines that the power supply is not a "smart" power supply, then the power supply operates in its default mode, e.g., output 5V or less over the VBus/P_IN contact illustrated in FIG. 2. If the portable device determines at step 312 that the power supply is not capable of communication with the portable device over the communication lines, then the power supply is operated as a regular power supply and in its low voltage or default mode (step 322).

If the portable device determines, based on the identification information received from the power supply, that the power supply capable of communicating with the portable device, the portable device sets its internal connections to enable a data communication channel between the power supply and the portable device (step 314). In some embodiments, the communication may occur using the UART transport or the USB transport over the dedicated data lines DPA/DNA as illustrated in FIG. 2. The portable device can then ask for additional information from the power supply (step 316), as illustrated in FIG. 3B. The additional information can include various types of information including capability information, ambient temperature information, information about voltage/current being outputted by the power supply at any given time, etc. In a particular embodiment, the additional information may include information about whether the power supply is capable of providing an output voltage between 6V and 20V. The portable device may receive the additional information and make a determination of whether the power supply can output between 6V and 20V (step 318). If the power supply is capable of delivering an output voltage of between 6V and 20V, then the portable device may request the power supply to output a specific voltage over the VBus/P_IN contact (step 320).

In some embodiments, the portable device may gradually increase the voltage from 5 V to about 20V in predetermined increments. In other embodiments, when the portable device determines that the power supply is capable of providing up to 20 V output, it may instruct the power supply to output the maximum voltage available. In other embodiments, the voltage that the portable device requests from the power supply may depend on the charging level of the battery of the portable device. For example, if the battery is 100% depleted or close to 100% depleted, the portable device may initially request the maximum voltage output from the power supply. As the battery begins to charge, the portable device may progressively reduce the output voltage requested from the power supply. For example, when the battery is 80% charged, the portable device may reduce the requested voltage from 20 V to 10 V.

It should be appreciated that the specific steps illustrated in FIGS. 3A and 3B provides a particular method for performing a high voltage charging operation according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. In particular, several steps may be omitted in some embodiments. One of ordinary skill in the art would recognize many variations, modifications, and alternatives.

In some embodiments, instead of the UART transport, the portable device may use the USB transport to exchange information with power supply 220. The portable device and the power supply may use an accessory communication protocol that is independent of the underlying transport mechanism. Thus, the accessory communion protocol can be used either over the UART or the USB transport mechanism.

Referring back to FIG. 1, accessory I/O interface 150 of portable device 102 and connector 152 of accessory 108 allow portable device 102 to be connected with accessory 108 and ultimately to power supply 104 and subsequently disconnected from accessory 108 and/or power supply 104. As used herein, a portable device and an accessory/power supply are "connected" whenever a communication channel is established between their respective interfaces and "disconnected" when the channel is terminated. Such connection can be achieved via direct physical connection, e.g., with mating connectors; indirect physical connection, e.g., via a cable; and/or wireless connection, e.g., via Bluetooth.

In some embodiments, a portable device and an accessory can communicate while connected by exchanging messages and data according to an "accessory protocol." The messages and data can be communicated, e.g., using any wired or wireless transport medium provided by the relevant interfaces.

The accessory protocol can define a "universe" of messages that can be exchanged between portable device 102 and any accessories connected thereto, such as accessory 108 and/or power supply 104. The message format can include, e.g., a start bit or bit sequence to indicate that what follows is a message code, followed by an actual message code that can be interpreted and acted on by the recipient. At least some of the message codes may have one or more associated parameters defined by the protocol, and a message can include values for any such parameters in addition to the message code. In some instances, the protocol can further specify a behavior for a recipient in the event that a particular parameter associated with a message code is not received or in the event that an unexpected parameter is received with a message code. The number of parameters can be different for different messages, and in some instances, a parameter may have variable length. In some embodiments, the message codes can be defined such that a given message code is valid in only one direction. Other message structures can also be used.

The accessory protocol can also define a format for the exchange of messages. For instance, the accessory protocol may specify that a message is sent using one or more packets, each of which has a header and a payload. The header provides basic information (e.g., a start indicator; length of the packet; packet sequence number; identifier of a session with which the packet is associated, as described below), while the payload provides all or part of the message data. The packet can also include error-detection or error-correction codes as known in the art.

In some embodiments, the messages can be logically grouped into a "general" message set and an "optional" message set. Every accessory and every portable device that use the accessory protocol can be required to support at least the general message set. This message set can include messages enabling the portable device and the accessory to identify and authenticate themselves to each other and to provide information about their respective capabilities, including which (if any) of the messages in the optional set each supports. For example, the general message set can include a message the accessory can send to the portable device to list every message in the optional set that the accessory is capable of sending and every message in the optional set that the accessory is capable of receiving and acting on. The general message set can also include authentication messages that the portable device can use to verify the purported identity and capabilities of the accessory (or vice versa), and the accessory (or portable device) may be blocked from invoking certain (or all) of the optional messages if the authentication is unsuccessful.

The optional message set can include messages related to various functionality that might or might not be supported in a given accessory. For example, the optional message set can include simple remote messages that allow an accessory to identify a function of the portable device to be invoked, remote user interface messages that can be used to obtain information related to replicating all or part of a user interface of a portable device on an accessory (thereby supporting a more advanced remote control), messages that allow a user to control a radio tuner in an accessory by operating a portable device and/or to control a radio tuner in a portable device by operating an accessory, messages that facilitate transfers of information between the portable device and the accessory/power supply (examples of which are describe below), and so on. Any combination of optional messages can be defined in an accessory protocol, and there is no requirement that a given accessory or portable device support all (or even any) of the optional messages.

Several types of information can be exchanged between the portable device and the accessory and/or power supply using the accessory protocol and the optional messages. Some examples of information that can be exchanged between the portable device and the power supply include but are not limited to (i) identification information of the power supply, (ii) serial number of the power supply, (iii) authentication information for the power supply, (iv) capabilities supported by the power supply, e.g., whether the power supply is capable of supplying 20 V, (v) instruction to the power supply to provide a particular output voltage, (vi) temperature readings within the power supply, (vii) error notifications, (viii) current monitoring for fault detection purposes, etc.

Figure 4:
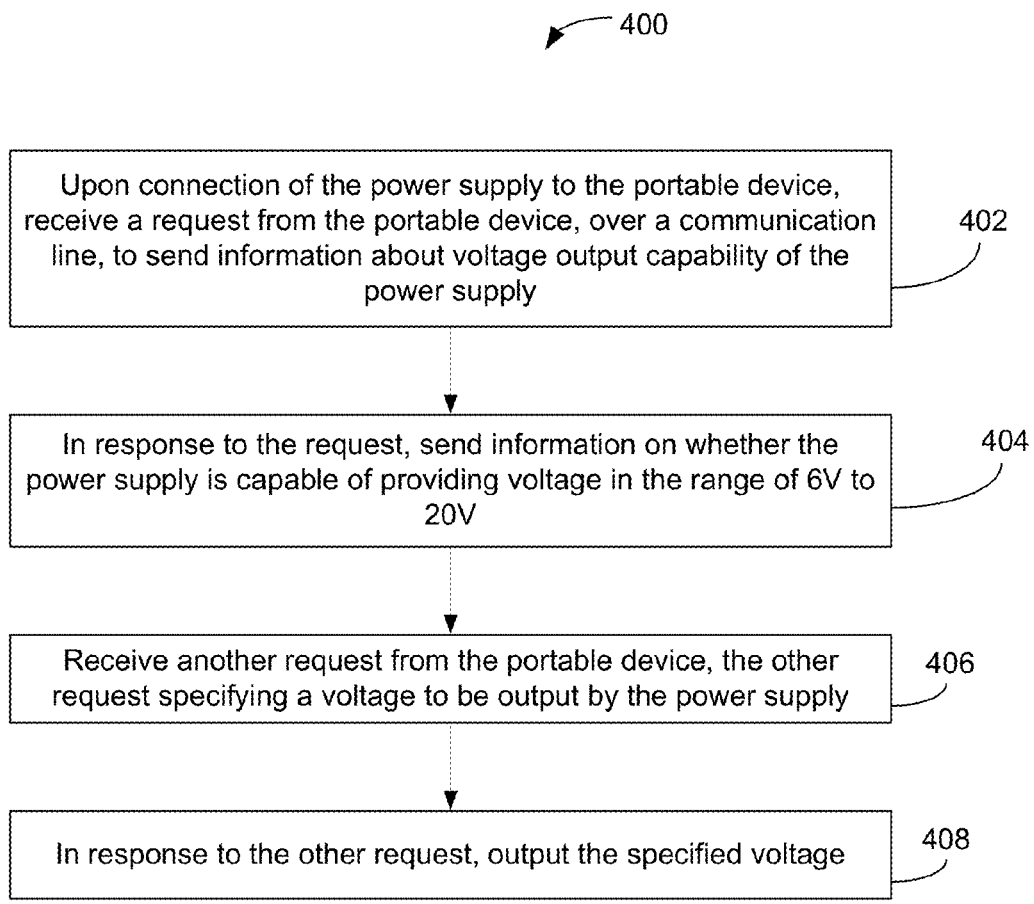
FIG. 4 is a flow diagram of process for providing power to a portable device according to an embodiment of the present invention.

FIG. 4 is a flow diagram for a process 400 for providing power to a portable device according to an embodiment of the present invention. Process 400 can be performed, e.g., by power supply 220 of FIG. 2. In this embodiment, it is assumed that the power supply is a "smart" power supply as defined above. Once the power supply is coupled to the portable device (e.g., via the accessory), the power supply receives a request from the portable device to send information about the capabilities of the power supply, among other information (step 402). Upon receiving the request, the power supply may respond back to the portable device informing the portable device that the power supply is capable of providing a high-voltage (e.g., between 6V and 20V) to the portable device (step 404). Based on this response, the power supply receives another request from the portable device, which specifies a particular voltage to be outputted by the power supply (step 406). In response to this other request, the power supply outputs the requested voltage (step 408).

It should be appreciated that the specific steps illustrated in FIG. 4 provides a particular method for providing voltage to a portable device according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. In particular, several steps may be omitted in some embodiments. One of ordinary skill in the art would recognize many variations, modifications, and alternatives.

When high-voltage charging as described in this application is used, certain safety mechanisms may be needed in order to prevent accidental output of 20 V at the output of the power supply. Referring back to FIG. 1, at least two potential scenarios can be envisioned where the power supply may need to rapidly terminate or reduce the voltage on its output connector if there is no portable device coupled to the power supply. Consider that the power supply is coupled to the portable device and is providing an output voltage of between 10V and 20V. In the first scenario, connector 152 may be unmated from connector 150. In this scenario, unless the power supply terminates its output power, a voltage of between 10V and 20V may be present on the power contact of connector 152. If this contact is accidently grounded, it may damage the accessory and/or the power supply. Also, having a constant 20V bias on the contact of connector 152 may cause dendrite growth that is detrimental to the long-term operation of the connector. This problem becomes acute when connector 152 has exposed contacts as described below in an embodiment for connector 152. In a second scenario, connector 154 can be unmated from connector 156. In the second scenario, a 20V bias would be active on a contact of connector 156. In instances where connector 156 is one of the commonly used connectors, e.g., a USB connector, some other device that has a complimentary connector can be connected to power supply 104 without realizing that the power supply is outputting 20V. If that device does not support 20V operation, then it could cause severe damage to the device. Hence it is beneficial to terminate the high voltage on the output of the power supply if a compatible device is not detected as being connected to the power supply.

Figure 5:
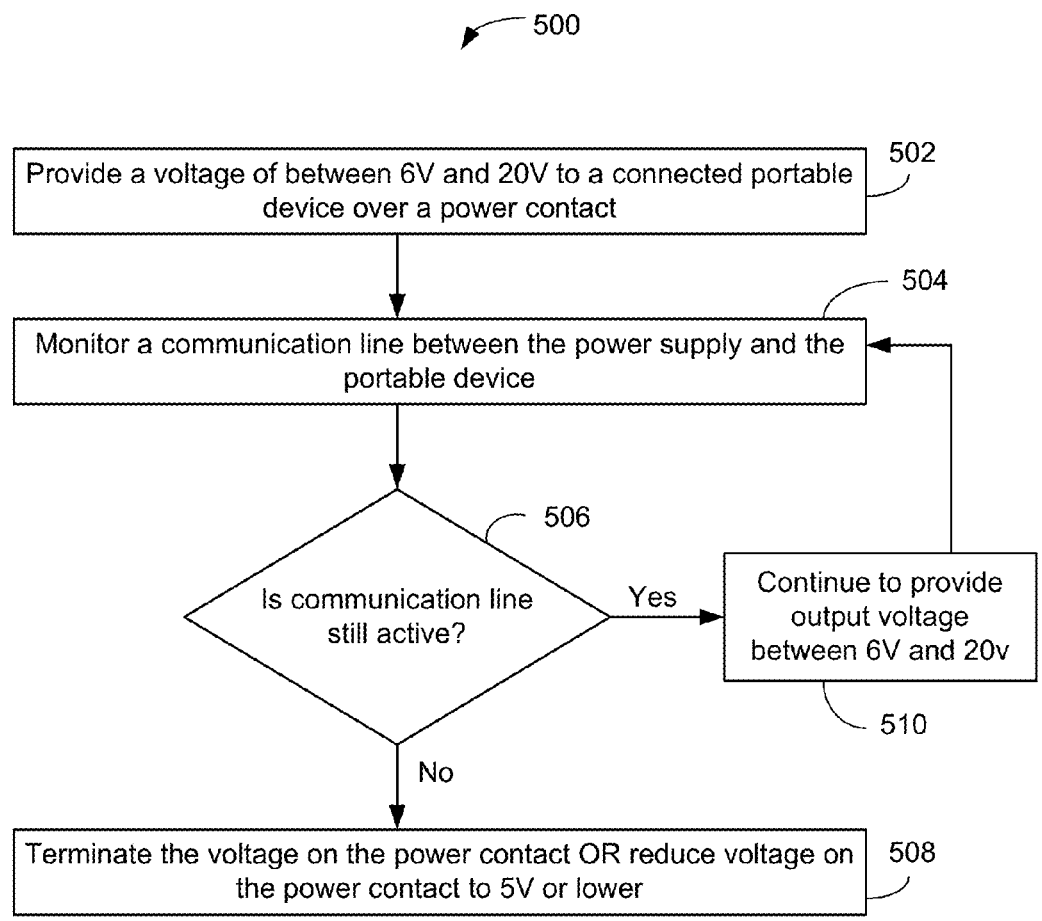
FIG. 5 is a flow diagram of a process for terminating power at the output of a power supply according to an embodiment of the present invention.

FIG. 5 is a flow diagram of a process 500 for terminating power at the output of a power supply according to an embodiment of the present invention. Process 500 can be performed, e.g., by power supply 220 of FIG. 2.

As described above, the power supply is coupled to the portable device and there exists a communication channel between them to exchange information. Using the process described above in relation to FIG. 4, the power supply can start supplying power at a higher voltage, e.g., between 6V and 20V, to the portable device (step 502). While the power supply is supplying the requested voltage, consider that either connector 152 or connector 156 is disconnected as described above. The power supply continuously monitors the communication line between the power supply and the portable device (step 504). The power supply continually or periodically checks to ensure whether the communication line is still active (step 506). In an embodiment, the check can be performed by sending a predetermined message to the portable device and looking for a response to the message. If the response is received, it means that the portable device is still connected. If no response is received, then it may mean that the portable device is either disconnected or powered down. In other embodiments, the power supply can monitor the voltage level of the communication lines. For example, the communication lines may have a certain voltage associated with them at an idle state. So if the power supply detects that the voltage during the idle state has dropped below that level, the power supply may conclude that the portable device is no longer connected to the power supply. If at step 506, it is detected that the communication line is not active, the power supply may terminate the output voltage or reduce the output voltage to a lower value, e.g., 5V or below (step 508). If the power supply detects that the communication line is still active, the power supply can continue supplying power to the portable device at the requested voltage (step 510).

It should be appreciated that the specific steps illustrated in FIG. 5 provides a particular method for terminating voltage on the output of a power supply according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. In particular, several steps may be omitted in some embodiments. One of ordinary skill in the art would recognize many variations, modifications, and alternatives.

As described above, the portable device may have a connector associated with it (e.g., connector 150 of FIG. 1). The power supply may be directly connected to the portable device or may be connected via an accessory (e.g., accessory 108 of FIG. 1). For example, referring to FIG. 2 above, accessory 214 may have a first connector (e.g., connecter 152 of FIG. 1) that can mate with a complimentary connector (e.g., connecter 150 of FIG. 1) on portable device 202 and another connector (e.g., connecter 154 of FIG. 1) that mates with a connector (e.g., connecter 156 of FIG. 1) of power supply 220.

Figure 6:
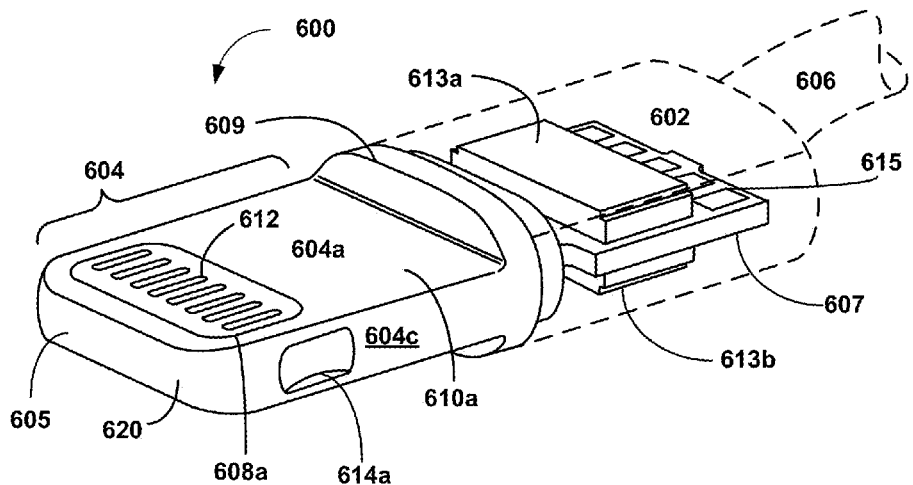
FIG. 6 is a plug connector that can mate with a complimentary connector of a portable media device according to an embodiment of the present invention.

FIG. 6 illustrates a plug connector 600 (e.g., connector 152 of accessory 108 of FIG. 1) according to an embodiment of the present invention. Plug connector 600 is exemplary and is used herein to explain the various embodiments of the present invention. One skilled in the art will realize that many other forms and types of connectors other than plug connector 600 can be used and that techniques described herein will apply to any plug connector that has the characteristics of plug connector 600. In some embodiments, plug connector 600 may be associated with an accessory (e.g., accessory 108) that can be coupled to a portable device (e.g., portable device 102).

Plug connector 600 includes a body 602 and a tab portion 604. A cable 606 is attached to body 602 and tab portion 604 and extends longitudinally away from body 602 in a direction parallel to the length of the connector 600. Tab 604 is sized to be inserted into a corresponding receptacle connector during a mating event and includes a first contact region 608a formed on a first major surface 604a and a second contact region 608b (not shown in FIG. 6) formed at a second major surface 604b (also not shown in FIG. 6) opposite surface 604a. Surfaces 604a, 604b extend from a distal tip of the tab to a spine 609 that, when tab 604 is inserted into a corresponding receptacle connector, abuts a housing of the receptacle connector or portable electronic device the receptacle connector is incorporated in. Tab 604 also includes first and second opposing side surfaces 604c, 604d (not shown) that extend between the first and second major surfaces 604a, 604b. In one particular embodiment, tab 604 is about 6.6 mm wide, about 1.5 mm thick and has an insertion depth (the distance from the tip of tab 604 to spine 609) of about 7.9 mm.

A plurality of contacts 612 can be formed in each of contact regions 608a and 608b such that, when tab 604 is inserted into a corresponding receptacle connector, contacts 612 in regions 608a or 608b are electrically coupled to corresponding contacts in the receptacle connector. In some embodiments, contacts 612 are self-cleaning wiping contacts that, after initially coming into contact with a receptacle connector contact during a mating event, slide further past the receptacle connector contact with a wiping motion before reaching a final, desired contact position. As can be seen, contacts 612 are external contacts and are exposed to the environment when the connector is not plugged into the receptacle connector.

As an example, in one embodiment an ID module (e.g., ID unit 218 of FIG. 2) is embodied within an IC operatively coupled to the contacts of connector 600. The ID module can be programmed with identification and configuration information about the connector and/or its associated accessory/adapter that can be communicated to a portable device during a mating event. As another example, an authentication module programmed to perform an authentication routine, for example a public key encryption routine, with circuitry on the portable device can be embodied within an IC operatively coupled to connector 600. The ID module and authentication module can be embodied within the same IC or within different ICs. As still another example, a current regulator (e.g., power control unit 216 of FIG. 2) can be embodied within one of IC's 613a or 613b. The current regulator can be operatively coupled to contacts that are able to deliver power to charge a battery in the portable electronic device and regulate current delivered over those contacts to ensure a constant current regardless of input voltage and even when the input voltage varies in a transitory manner.

Bonding pads 615 can also be formed within body 602 near the end of PCB 607. Each bonding pad can be connected to a contact or contact pair within regions 608a and 608b. Wires (not shown) can then be soldered to the bonding pads to provide an electrical connection from the contacts to circuitry within an accessory associated with connector 600. In some embodiments, however, bonding pads are not necessary and instead all electrical connections between the contacts and components of connector 600 and other circuitry within an accessory are made through traces on a PCB that the circuitry is coupled to and/or by interconnects between multiple PCBs within the accessory.

The structure and shape of tab 604 is defined by a ground ring 605 that can be made from stainless steel or another hard conductive material. Connector 600 includes retention features 614a, 614b (not shown) formed as curved pockets in the sides of ground ring 605 that double as ground contacts. Body 602 is shown in FIG. 6 in transparent form (via dotted lines) so that certain components inside the body are visible. As shown, within body 602 is a printed circuit board (PCB) 607 that extends into ground ring 605 between contact regions 608a and 608b towards the distal tip of connector 600. One or more integrated circuits (ICs), such as Application Specific Integrated Circuit (ASIC) chips 613a and 613b, can be operatively coupled to PCB 607 to provide information regarding connector 600 and/or to perform specific functions, such as authentication, identification, and current or power regulation.

When connector 600 is properly engaged with a receptacle connector, each of contacts 612 in one of the regions 608a or 608b is in electrical connection with a corresponding contact of the receptacle connector.

Figure 7:
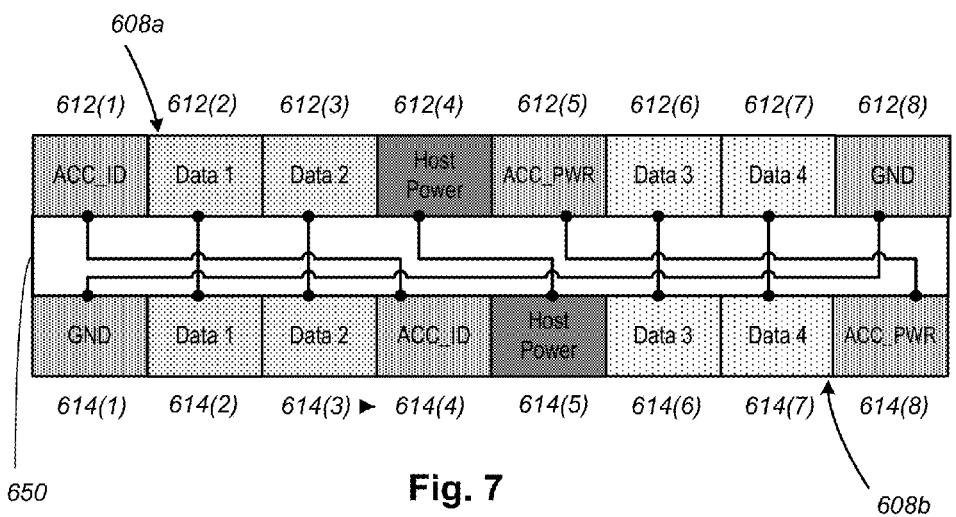
FIG. 7 is a pin-out of a plug connector of FIG. 6 according to an embodiment of the present invention.

FIG. 7 illustrates a pin-out configuration for connector 600 according a particular embodiment of the present invention.

Connector 600 is a reversible connector. In other words, based on the orientation in which connector 600 is mated with a corresponding connector of a portable device, either the contacts on the surface 608a or 608b are in physical and electrical contact with the contacts in the corresponding connector of the portable device. As illustrated in FIG. 7, connector 600 may have eight contacts arranged on an upper surface of a PCB 650 and eight contacts arranged on a lower surface of PCB 650.

Connector 600 includes two contacts 612(1) and 614(4) that can function as accessory ID contacts to carry the identification signals between the accessory and the portable electronic device. Contacts 612(1) and 614(4) are electrically connected to each other as illustrated in FIG. 7. Connector 600 can have four pairs of data contacts, (a) 612(2) and 612(3), (b) 612(6) and 612(7), (c) 614(2) and 614(3), and (d) 614(6) and 414(7). In this particular embodiment, opposing data contacts, e.g., 612(2) and 614(2), are electrically connected to each other via PCB 650 as illustrated in FIG. 7. In an embodiment, a pair of data contacts, e.g., contacts 612(2) and 612(3), may be used for communication between the power supply and the portable device (e.g., DPA and DNA illustrated in FIG. 2). Connector 600 may further include portable device power contacts 612(4) or 614(5) that may be electrically connected to each other. Portable device power contacts 612(4) or 614(5) can carry power to the portable device that is mated with connector 600 (i.e. the P_IN contact described above in FIG. 2). For example, plug connector 600 may be part of a power supply system designed to provide power to the portable device. In this instance, either contact 612(4) or 614(5) may carry power from the power supply to the portable device, e.g., to charge a battery in the portable device.

Connector 600 may further include accessory power contacts 612(5) and 614(8) that may be electrically connected to each other, e.g., via PCB 650. Accessory power contacts carry power from the portable device to a connected accessory. For example, in some instances, an accessory connected to the portable device may not be self-powered and may derive its power from the portable device. In this instance, the portable device can supply power to the accessory over either of the accessory contacts, depending on the orientation of connector 600 with respect to a corresponding connector of the portable device. Connector 600 may further include two ground contacts 612(8) and 614(1) electrically connected to each other. The ground contacts provide a ground path for connector 600.

It is to be noted that the connector 600 is merely exemplary and other suitable connector can be used instead of connector 600 and the techniques described can be used with any other connector.

Figures 8, 9:
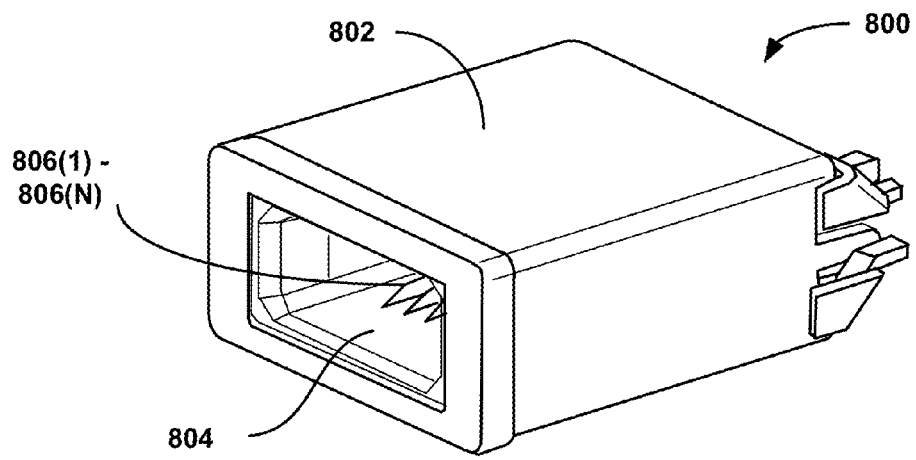
FIG. 8 illustrates a receptacle connector of the portable device according to an embodiment of the present invention.
FIG. 9 illustrates a pin-out arrangement of a receptacle connector configured to mate with plug connector of FIG. 6 according to an embodiment of the present invention.

FIG. 8 illustrates a receptacle connector 800 according to an embodiment of the present invention. Receptacle connector 800 includes a housing 802 that defines a cavity 804 and houses N contacts $806_{(1)}$-$806_{(N)}$ within the cavity. In operation, a connector plug, such as plug connector 600 can be inserted into cavity 804 to electrically couple the contacts $612_{(1)}$-$612_{(N)}$ to respective contacts $806_{(1)}$-$806_{(N)}$. Each of the receptacle connector contacts $806_{(1)}$-$806_{(N)}$ electrically connects its respective plug contact to circuitry associated with the portable device in which receptacle connector 800 is housed. For example, receptacle connector 800 can be part of a portable device (e.g., portable device 202) and electronic circuitry associated with the portable device is electrically connected to receptacle 800 by soldering tips of contacts $806_{(1)}$-$806_{(N)}$ that extend outside housing 802 to a multilayer board such as a printed circuit board (PCB) within the portable media device. Note that connector 800 includes contacts on just a single side so it can be made thinner. In other embodiments, connector 800 may have contacts on each side.

In some embodiments, the receptacle connector may have contacts $806_{(1)-(N)}$ only on a single side inside cavity 804 as described above. In a particular embodiment, receptacle connector 800 may have eight (8) contacts $806_{(1)}$-$806_{(8)}$). Some or all of these contacts may be configured to perform one of several functions depending on the signals available on a plug connector. Plug connector 600 may be associated any one of several accessories that may be designed to work with a portable device that is associated with receptacle connector 800. For example, plug connector 600 may be associated with an audio only accessory in which case the signals available on the contacts, e.g., $612_{(1)}$-$612_{(N)}$, of the plug connector may include audio and related signals. In other instances, where plug connector 600 is associated with a more complex accessory such as video accessory, the contacts of plug connector may carry audio, video, and related signals. Thus, in order to enable receptacle connector 800 to be operable with various different types of signal, contacts $806_{(1)-(8)}$ of receptacle connector 800 can be made configurable based on the signals available from a plug connector 600.

In a particular embodiment, receptacle connector 800 has eight contacts $806_{(1)-(8)}$ in addition to two connection detection contacts $808_{(1)}$ and $808_{(2)}$. Some or all of contacts $806_{(1)-(8)}$ may have an associated switch that can configure the contact to carry one of many possible signals.

As illustrated in FIG. 9, in a particular embodiment, contact $806_{(1)}$ may be configured to be a ground contact regardless of the orientation of the plug connector.

In a particular embodiment, contacts $806_{(2)}$ and $806_{(3)}$ may form a first pair of data contacts (DP1/DN1). The data contacts may be configured to carry one or more of a variety of signals, such as (a) USB differential data signals, (b) non-USB differential data signal, (c) UART transmit signal, (d) UART receive signal, (e) digital debug input/output signals, (f) a debug clock signal, (g) audio signals, (h) video signals, etc.

In a particular embodiment, contact $806_{(4)}$ may be an identification bus pin (ACC_ID) and can be configured to communicate a command operable to cause an accessory to perform a function and provide a response to a portable device unique to the command. Alternatively, contact $806_{(4)}$ may be configured to accessory power (ACC_PWR) contact for carrying power from the portable device to the accessory (depending on the orientation of the plug connector).

In a particular embodiment, contact $806_{(5)}$ may carry incoming power (e.g., a positive voltage relative to another contact such as a ground pin) to the portable device (e.g., from a power source in or coupled to the accessory) with which receptacle connector 800 is associated, regardless of the orientation of the plug connector.

In a particular embodiment, contacts $806_{(6)}$ and $806_{(7)}$ may form a second pair of data pins (DP2/DN2) and can each be configured to carry one or more of a variety of signals, such as (a) USB differential data signals, (b) non-USB differential data signal, (c) UART transmit signal, (d) UART receive signal, (e) digital debug input/output signals, (f) a debug clock signal, (g) audio signals, (h) video signals, etc.

In a particular embodiment, contact $806_{(8)}$ may be configured to be an accessory power contact (ACC_PWR) for carrying power to the accessory. Alternatively, contact $806_{(8)}$ may be an identification bus pin (ACC_ID) and can be configured to communicate a command operable to cause an accessory to perform a function and provide a response to a portable device unique to the command (depending on the orientation of the plug connector).

As described above, using the UART transport is only one way that the power supply can communicate with the portable device. If the portable device has a USB host adapter, then the portable device can communicate with the power supply over the USB transport. In some embodiments, in addition to sending capability information to the portable device, the power supply may also send ambient temperature information over the communication lines. This could be used in fault detection and/or control of the power supply.

For example, consider that the power supply is designed to output a maximum of 20V and the maximum allowable operating temperature of the power supply is 50 C. In this instance, the portable device may periodically request an ambient temperature reading from the power supply. If the ambient temperature is less than the maximum allowable temperature, the portable device can request the power supply to output maximum voltage. As the ambient temperature starts rising, the portable device can measure this voltage and lower the requested output voltage accordingly to prevent failure of the power supply. Thus a continuous control for the output voltage of the power supply can be accomplished thus increasing the efficiency of the power supply. In another embodiment, the power supply itself can monitor its internal temperature and lower its output voltage accordingly to prevent heat related failure.

In yet another embodiment, where the power supply is connected to the portable device via an accessory (e.g., a cable), the voltage at the output of the power supply may not be the same as the voltage at the input of the portable device due to voltage drop across the length of the cable. This is especially true when the cable is very long. In such an instance, the portable device can request a certain voltage output (e.g., 5V) from the portable device can measure the voltage at the P_IN contact of its connector. Based on that, the portable device may communicate with the power supply over the communication line and ask the power supply to increase its voltage output so that the portable device actually sees 5V at its input even after the voltage drop across the cable. This allows finer control of the charging process to increase efficiency.

Another advantage of active communication between the power supply and the portable device is advantageous in fault detection. In one embodiment, the portable device can monitor the current it is drawings based on the voltage it receives from the power supply. The power supply can also monitor the current it is providing to the portable device. The portable device can communicate the current value it is drawing to the power supply. The power supply can compare that current value to the current that it measures at its output. If the two current values are similar to within a predetermined range, then the power supply can conclude that there is no problem. If however, the two current values are different and outside of the range, then the power supply may conclude that there is some fault condition and may either shut down or lower its output voltage to a lower value. For example, if the portable device tells the power supply that it is drawing 1 Amp of current and the power supply measures 1.5 Amps at its output, then the power supply can conclude that there is some problem and the 0.5 Amps that is unaccounted for may cause an imminent failure and thus shut itself down. On the other hand if the power supply measures 1.1 Amps at its output, it may keep supplying the power. The predetermined range can be programmed based on the power supply, the portable device and amount of fault tolerance built into these devices.

Circuits, logic modules, processors, and/or other components can be described herein as being "configured" to perform various operations. Those skilled in the art will recognize that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

While the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded on various non-transitory computer readable storage media; suitable media include magnetic disk or tape, optical storage media, such as compact disk (CD) or DVD (digital versatile disk), flash memory, and the like. Computer readable storage media encoded with the program code can be packaged with a compatible device or provided separately from other devices. In addition program code can be encoded and transmitted via wired optical, and/or wireless networks conforming to a variety of protocols, including the Internet, thereby allowing distribution, e.g., via Internet download.

Thus, although the invention has been described with respect to specific embodiments, it will be appreciated that the invention is intended to cover all modifications and equivalents within the scope of the following claims.

What is claimed is:

1. A method for charging a portable device using a power supply, the method comprising:
   detecting, by the portable device, coupling of the power supply to the portable device;
   receiving, by the portable device, identification information from the power supply;
   enabling, by the portable device, a communication channel between the power supply and the portable device based on the identification information;
   determining, by the portable device, based on additional information received from the power supply, that the power supply is capable of providing voltage of up to 20 V;
   sending, by the portable device, a message to the power supply to output a specific voltage; and
   receiving, by the portable device, the specific voltage.

2. The method of claim 1 wherein prior to enabling the communication channel, determining, by the portable device, a class associated with the power supply, based on the identification information.

3. The method of claim 1 wherein the communication channel comprises a universal asynchronous receiver/transmitter (UART) transport or universal serial bus (USB) transport.

4. The method of claim 1 wherein the specific voltage is in the range of between 6 V and 20 V.

5. The method of claim 1 wherein the message to the power supply includes information about supplying a specific voltage that is between 6 V and 20 V.

6. The method of claim 1 wherein a first voltage is received, by the portable device, before the specific voltage.

7. The method of claim 6 wherein the first voltage is approximately 5 V.

8. The method of claim 1 wherein prior to enabling the communication channel, determining, by the portable device, a class associated with the power supply, based on the identification information.

9. A method comprising:
   receiving, by a power supply, a message from a portable device coupled to the power supply, the message requesting capability information from the power supply over a data communication channel, the data communication channel being separate from a power output signal;
   sending, by the power supply, the capability information to the portable device, the capability information including information about whether the power supply is capable of outputting between 6 V and 20 V to the portable device;
   receiving, by the power supply from the portable device, another message specifying a value for a voltage to be outputted by the power supply; and
   outputting, by the power supply, the specified voltage.

10. The method of claim 9 wherein a first voltage is outputted by the power supply before the specified voltage.

11. The method of claim 10 wherein the first voltage is approximately 5 V.

12. An electronic device comprising:
a first connector including a first plurality of contacts configured to mate with a second connector of an accessory having a second plurality of contacts, wherein at least one contact from the first plurality of contacts is configured to carry power to the electronic device and at least a pair of contacts from the first plurality of contacts are configured to carry data between the electronic device and the accessory;
circuitry coupled to the first connector and configured to:
detect coupling of the accessory;
receive identification information from the accessory;
enable a communication channel with the accessory over the pair of contacts from the first plurality of contacts;
receive capability information from the accessory over the communication channel, the capability information indicating that the accessory is capable of supplying an output voltage between 6V and 20V to the electronic device;
send an instruction to the accessory to output a specific voltage between 6V and 20V; and
receive the specific voltage.

13. The method of claim 12 wherein prior to enabling the communication channel, determining, by the portable device, a class associated with the power supply, based on the identification information.

14. The method of claim 12 wherein the communication channel comprises a universal asynchronous receiver/transmitter (UART) transport or universal serial bus (USB) transport.

15. A power supply comprising:
a connector having a power contact coupleable with an electronic device to deliver power to the electronic device and a pair of data contacts;
a voltage regulator configured to provide an output voltage in the range of 1-20 V via the at least one contact;
a controller coupled to the pair of data contacts and configured to exchange information with the electronic device via the pair of data contacts; and
identification circuitry operable to generate identification information for the power supply, wherein the power supply is configured to:
output a first voltage over the power contact upon connection with the electronic device;
provide identification information to the electronic device;
receive a request from the electronic device over the pair of data contacts, the request being for determining whether the power supply can output a second voltage;
send a response to the request indicating that the power supply can output the second voltage over the power contact;
receiving a request from the electronic device to output the second voltage; and
output the second voltage, the second voltage being higher than the first voltage.

16. The power supply of claim 15 wherein the first voltage is between 1 V and 5 V and the second voltage is between 6 V and 20 V.

17. The method of claim 15 wherein the portable device is configured to determine a class associated with the power supply based on the identification information.

18. The method of claim 15 wherein the identification information is transferred over a communication channel that comprises a universal asynchronous receiver/transmitter (UART) transport or universal serial bus (USB) transport.

* * * * *